United States Patent Office 3,473,175
Patented Oct. 21, 1969

3,473,175
PROCESS AND APPARATUS FOR THE CONTROLLED TREATMENT OF TEXTILES
Johannes Helmut Sieber, Neusass, near Augsburg, Germany, assignor to American Permac, Inc., Garden City, N.Y., a corporation
Filed Feb. 14, 1968, Ser. No. 707,380
Claims priority, application Germany, Dec. 23, 1960, B 60,633
Int. Cl. D06f 35/00, 39/00
U.S. Cl. 8—158        13 Claims

ABSTRACT OF THE DISCLOSURE

Process and apparatus for the treatment of textiles wherein the textiles are tumbled in a drum of a drycleaning machine in which the organic vehicle receives a minor proportion of water in a mechanical dispersion therein. The fabric is pretreated with the solvent to limit penetration by the water and the dispersed condition is created by mechanical means to the exclusion of any chemical emulsifying agents. Such means include the circulating pump, a vibrator element in the liquid, an atomizer externally of the machine in the circulating path for injecting steam and/or the agitation produced by the rotating drum itself.

---

Figure 1:
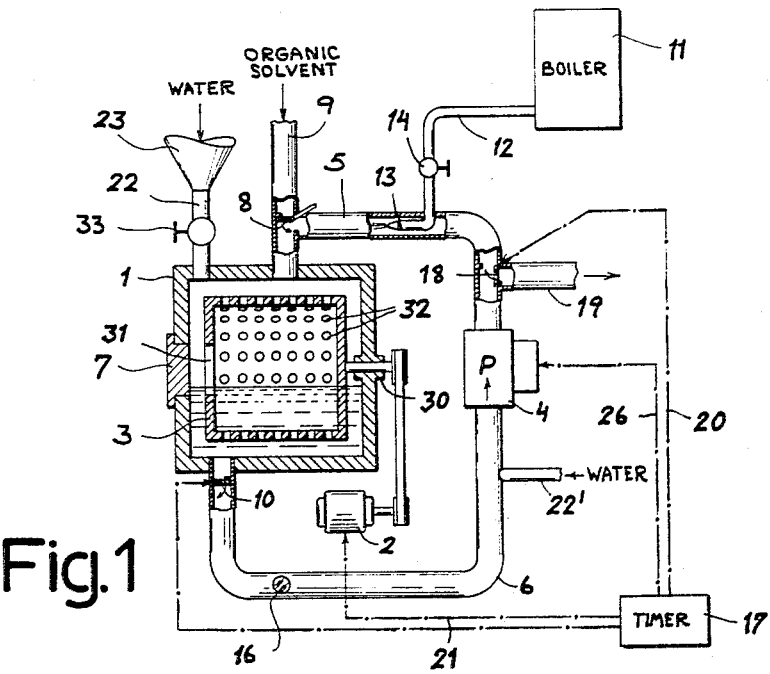

My present invention relates to a process and an apparatus for the controlled treatment of textiles in a dry-cleaning plant as described in my prior U.S. Patent No. 3,330,015 and my copending application Ser. No. 461,224 filed May 3, 1965, now Patent No. 3,370,330.

As disclosed in these earlier patents, textile fabrics of water-absorbing character can be treated in a variety of ways, with or without the application of a special conditioner, waterproofing agent or other adjuvant, by dispersing a relatively small amount of water in a relatively large amount of an organic liquid having a certain affinity for water and acting as a solvent for grease and soil; this vehicle may comprise one of the usual cleaning fluids commercially employed, such as perchloroethylene or trichloroethylene. The resulting mixture may thus be used for effective cleaning, for milling or fulling, for bleaching or coloring, and for treatment with any other suitable adjuvant adapted to be dissolved in the aqueous fraction of the treatment bath.

According to the teachings of my above-identified patents and application, a high degree of dispersion of the water in the organic vehicle is achieved by admixing therewith a small percentage of an emulsifier or surfactant whose quantity, variable between certain limits, depends on the desired liquor ratio. I have now found, in accordance with the present invention, that the step of adding such surfactant may be replaced by other measures insuring fine distribution of the water particles throughout the organic phase, the general object of this invention being therefore the simplification of the previously disclosed process and the provision of apparatus for carrying out such process without the need for any surface-active agent.

This object is realized, pursuant to my present invention, by mechanically dispersing the water in the organic vehicle before allowing the water to penetrate the fabric, the latter being thereafter immersed in the mixture for a period sufficient to cause partial absorption of the finely distributed water from the mixture by the textiles. Advantageously, pursuant to another feature of my invention, the water is present within the organic vehicle in an amount somewhat greater than that absorbable by the textiles during the treatment period, in order to insure proper absorption of the desired water quantity by the fibers. In accordance with the teachings of my prior patents, this quantity may range between 5 and 50% of the dry weight of the load of textiles to be treated; in order to provide the desired excess, the water used in the process according to my present improvement may range between 10% and 55% of this dry weight. At the same time, the weight ratio between the organic vehicle and the water may range between about 2:1 and 50:1.

The above values are generally suitable for treatment times ranging between about 2 and 20 minutes at room temperature, the treatment being accelerated when carried out at elevated temperatures up to, say, 40° C. I have found that, in a system in which the liquor can be recirculated from and to the treatment vessel, it is easy to determine the presence of an excess of water by observing the appearance of the recirculated fluid which will be somewhat cloudy if residual water is entrained by the organic solvent. This excess also insures that the fabric, after the draining of the treatment bath and upon preliminary drying by aeration and/or centrifugation, will still be sufficiently wet to facilitate subsequent pressing on an ironing board or other crease-forming means.

The physical dispersion of the water in the organic vehicle may be carried out by various means. A relatively simple expedient, utilizing equipment available at commercial dry-cleaning installations, is the use of a perforated drum or basket rotatably journaled in a treatment vessel into which the water and the solvent are admitted separately or together. In this instance, if the load is to be placed in the drum before introduction of the fluid, protection of the fabric from direct penetration by the aqueous constituent may be obtained by presoaking the fabric in a bath of pure organic solvent and only thereafter allowing the water to enter the drum. Other possibilities, adapted to be used alternatively or in addition to the technique just described, include the injection of an aqueous medium into the organic vehicle in atomized form from a spray nozzle, with the medium constituted either by water or by steam which condenses upon striking the bath, as well as agitation of the mixture with the aid of a preferably supersonic vibrator; I have further found that the desired degree of dispersion can be mechanically achieved by passing the mixture through a forced-feed circulator, such as a centrifugal pump or a gear pump, or other homogenizing device.

Figure 2:
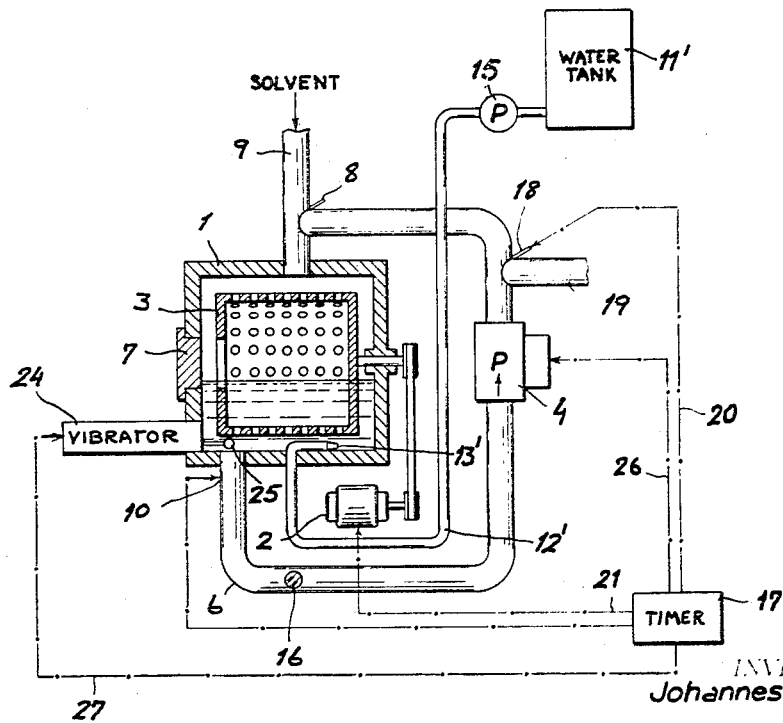

The above and other features of my invention will become more readily apparent from the following detailed description of certain embodiments, reference being made to the accompanying drawing in which FIGS. 1 and 2 are partly diagrammatic illustrations of two representative embodiments.

The system shown in FIG. 1 resembles a conventional dry-cleaning plant and is also similar to the installations illustrated in my aforementioned U.S. patents as well as my prior U.S. Patent No. 3,206,951. It comprises a treatment vessel 1 wherein a drum 3 is journaled at 30 for rotation about a horizontal axis under the control of a drive motor 2, the drum having a loading aperture 31 adjacent a door 7 in vessel 1. The peripheral wall of drum 3 is perforated at 32. Organic solvent is admitted into the vessel 1, from a reservoir not shown, by way of a conduit 9 containing a two-way valve 8 adapted for alternate blocking and unblocking the admission of fresh solvent or the recirculation of liquid from vessel 1 via a return pipe 6 and a pump 4. The inlet to pipe 5 is initially closed by a valve 10; another two-way valve 18 normally blocks an outlet 19 from an inlet pipe 5 and has an alternate position in which the return to vessel 1 is closed and the output of pump 4 is delivered to this outlet for return to a solvent-recovery and filtering stage not shown. A sight glass 16 in conduit 6 enables visual observation of the liquid withdrawn from vessel 1.

Water can be admitted into vessel 1 through a funnel 23 rigid with a feed pipe 22. In addition, a tube 12 from a boiler 11 terminates at a nozzle 13 within pipe 5 for the delivery of a mist of water vapor to the inlet 9 of vessel 1; the steam supplied to nozzle 13 is controlled by a manually operable valve 14. Motor 2, pump 4 and valves 10 and 18 are under the control of a programmer or timer 17.

In operation, a load of textiles to be treated is introduced through door 7 into drum 3 and is then presoaked in a suitable organic liquid, such as a chlorinated or chlorofluorinated hydrocarbon, admitted via conduit 9 into vessel 1. Motor 2 may be driven during this soaking operation. Next, additional solvent and a minor amount of water are introduced into the vessel through pipes 9 and 22, respectively, and are intimately mixed with each other by the continuing rotation of drum 3 through whose orifices 32 the mixture is allowed to circulate. Additional water may be injected, upon reversal of valve 8, in the form of steam from boiler 11 through nozzle 13. When the necessary proportion of water and solvent has been established, and upon closure of a valve 33 in pipe 22 to prevent evaporation of volatile fluid into the atmosphere, valve 10 may be opened to allow recirculation of the liquid mixture with the aid of pump 4 which is concurrently set in operation; valve 14 may also be closed at this time. After the necessary treatment period, valve 18 is reversed to drain the liquid from vessel 1 while the drum 3 continues its rotation to predry the load by centrifugal action.

The introduction of water into the system may be preceded by removal of the excess of organic soaking liquid via conduits 6, 19 to the filtering, adsorbing and/or regenerating station from which the purified solvent is returned to its reservoir before being readmitted to vessel 1.

FIG. 1 also illustrates an auxiliary water inlet 22' just ahead of the inlet port of pump 4 whose gears help distribute this water by mechanical action in the circulating solvent. It will be understood that the several water inlets 13, 22 and 22' may be used in combination or separately.

The system of FIG. 2 is generally similar to that of FIG. 1, except for the omission of water inlets 22, 23 and 22'; instead, a supersonic vibrator 24 terminating in a stirrer 25 acts upon the pool of liquid in vessel 1, underneath drum 3, and another nozzle 13' is directly connected via a conduit 12' to a water tank 11' adapted to be emptied at a controlled rate by means of a gear pump 15. Nozzle 13 dispenses the water from tank 11' as a finely comminuted spray into the solvent bath where it is further distributed by the mechanical action of stirrer 25 and drum 3. Again, the vibrator attachment 24, 25 and the inlet nozzle 13' may be used in combination with any of the other feed means shown in FIG. 1.

The operation of the system of FIG. 2 is basically the same as that of FIG. 1.

The process according to my invention, performable with the system of FIG. 1 or FIG. 2, will now be described with reference to several illustrative examples.

Example I

The drum 3 is loaded with 100 kg. of woolen sweaters fresh from the knitting machine, made from unwashed yarn.

The goods are presoaked in freshly distilled perchloroethylene for a period of three minutes whereupon the solvent is withdrawn and regenerated by filtering or redistillation. The textiles are then centrifuged for several minutes more with recovery of additional solvent. Fresh perchloroethylene in an amount of about 800 liters and at a temperature of approximately 30° C. is then admitted into the vessel 1. Motor 2 is set in motion, together with the agitator 24, 25 if provided. A quantity of 25 liters of water is then gradually admitted by one or more of the several inlets 13, 13', 22, 22' shown in the drawing, with recirculation of the liquid mixture through ducts 6, 5 by means of pump 4; these operations are under the control of timer 17 which is started during or after the feeding of the second solvent bath. The rate of water admission is so chosen that the entire quantity enters the system in about one minute. After a tumbling period of 2.5 minutes, during which a substantial part of this water is absorbed by the fibers of the textile batch, valve 18 is reversed to drain the vessel 1 and the drum 3 of liquid. The outflowing fluid passing through discharge pipe 6 still contains a residue of water as can be verified by the observation of its cloudy appearance through the sight glass 16.

Further centrifuging and subsequent final drying yields a set of clean and degreased garments, with controlled shrinkage.

Example II

The procedure of Example I is modified by replacing the quantity of 25 liters of pure water by a mixture of 18 liters of water with 4 liters of a commercial abrasion-proofing agent such as a water-soluble silica-ester compound containing about 50% of water by weight; the total quantity of the aqueous phase is therefore 20 liters. The procedure is otherwise the same as described above.

Example III

A charge of 50 kg. of clothing of 65/35 polyester/cotton fabric is presoaked and tumbled in 300 liters of trichloroethylene in the presence of a commercial detergent. Upon removal of this bath from the vessel and partial drying of the load by continued centrifuging, another volume of 300 liters of trichloroethylene is admitted. Steam and/or water is then introduced, with continuing agitation and recirculation by means of pump 4, at a rate of 5 liters per minute for three minutes with periodic inspection of the cloudy state of the recirculating mixture. After several minutes of further tumbling the liquid is drained off and the goods are dried and removed from the drum. The amount of water here used does not exceed the adsorption capacity of the load and is therefore readily taken up by the fabric without inducing objectionable shrinkage.

Example IV

The water injected into the circulating solvent via nozzle 13 or 13' and/or inlet 22' is replaced by 15 liters of an aqueous emulsion of starch, the latter being present in a proportion of 10% by weight of the water. After completion of the treatment in accordance with the procedure described above, the goods require only a minimum amount of steaming and are uniformly starched.

The treatment of Example III is repeated with 50 kg. of cotton goods and with introduction of water at a rate of 10 liters per minute to create an excess. After the liquid has been drained off, the load continues to spin for about 10 minutes to evaporate the residual solvent. The goods are thereupon extracted from the drum in a sufficiently wet state to facilitate ironing or other aftertreatment.

It should be understood that the various treatments described in my prior Patents Nos. 3,330,105 and 3,370,330 can be similarly modified in accordance with my present invention, by omitting the previously disclosed surfactant and increasing the amount of water by about 10 to 20%, with possible reduction of the treatment period given in the examples of these patents. The term "solvent" is intended to include gasoline and other petroleum fractions.

I claim:

1. A process for treating water-absorbing textiles, comprising the steps of: dissolving a water-soluble textile treatment agent with water; mixing an organic liquid vehicle with a minor proportion of the water with said agent dissolved therein and in the absence of an emulsifying agent, the weight ratio of said vehicle to said water ranging between substantially 2:1 to 50:1; distributing the water in said vehicle by physical dispersion at least in part by joint circulation of the vehicle and water mixture through a homogenizer, immersing in the resultant mixture a load of textiles to be treated while protecting the textiles from penetration by the water alone by soaking said textiles in a bath of said vehicle immediately before exposing said load to said mixture; and continuing the immersion for a period sufficient to cause at least partial absorption of the distributed water from said mixture by said textiles.

2. A process as defined in claim 1 wherein the mechanical dispersion of water in said vehicle is maintained at least in part by tumbling the presoaked textiles in a perforated drum inside a vessel containing said mixture.

3. A process as defined in claim 1 wherein the water is at least partly mechanically dispersed in said vehicle by vibrating a body in said mixture at supersonic frequencies.

4. A process as defined in claim 1 wherein the water is mechanically dispersed in said vehicle at least in part by atomizing an aqueous medium while injecting same into said vehicle.

5. A process as defined in claim 4 wherein said aqueous medium is steam.

6. A process as defined in claim 1 wherein the quantity of said water exceeds the amount absorbable by said load.

7. A process as defined in claim 6 wherein said quantity ranges between substantially 10% and 55% of the dry weight of said load.

8. A process as defined in claim 1 wherein the immersion is carried out in a vessel with continuous recirculation of liquid removed from and returned to said vessel, further comprising the step of observing the recirculated liquid and discontinuing the immersion while said liquid is in a cloudy condition indicative of the presence of residual water in said vehicle.

9. A process as defined in claim 1 wherein the immersion time ranges between substantially 2 and 20 minutes.

10. An apparatus for treating water-absorbing textiles, comprising a treatment vessel, conduit means connecting said vessel with a source of water and a supply of organic liquid vehicle miscible with water, distributing means for mechanically mixing water from said source in finely dispersed form with a larger proportion of liquid vehicle from said supply preparatorily to immersing a load of textiles in the resulting mixture within said vessel, a perforated drum rotatably journaled in said vessel, drive means for rotating said drum, said load being receivable in said drum, and pipe means forming a closed path for the recirculation of said mixture, said distributing means including a pump in said path and a spray nozzle connected to a steam boiler and opening into said pipe means for injecting steam into the mixture circulating therein.

11. An apparatus as defined in claim 10 wherein said distributing means further includes a supersonic agitator in said vessel.

12. An apparatus as defined in claim 10, further comprising timer means for controlling said distributing means and drain means for removing said mixture from said vessel under the control of said timer means in a terminal operating stage of said distributing means.

13. An apparatus as defined in claim 12 wherein said vessel is provided with mechanism for agitating said load concurrently with the operation of said distributing means under the control of said timer means.

References Cited

UNITED STATES PATENTS

| | | | |
|---|---|---|---|
| 2,158,614 | 5/1939 | Reddish | 68—18 X |
| 2,614,026 | 10/1952 | Lascari | 8—142 |
| 3,085,416 | 4/1963 | D'Hooge | 68—13 |
| 3,333,316 | 8/1967 | Cosnard | 8—139.1 |

FOREIGN PATENTS

| | | |
|---|---|---|
| 213 | 1910 | Great Britain. |
| 76,440 | 4/1946 | Norway. |

WILLIAM I. PRICE, Primary Examiner

U.S. Cl. X.R.

8—139.1; 68—3, 18, 207